May 14, 1963

R. P. ALER 3,089,528

CONVERTIBLE WHEEL TRACTION AID

Filed June 14, 1962

Richard P. Aler
INVENTOR.

BY *Thomas A. O'Brien*
*and Harvey B. Jacobson*
Attorneys

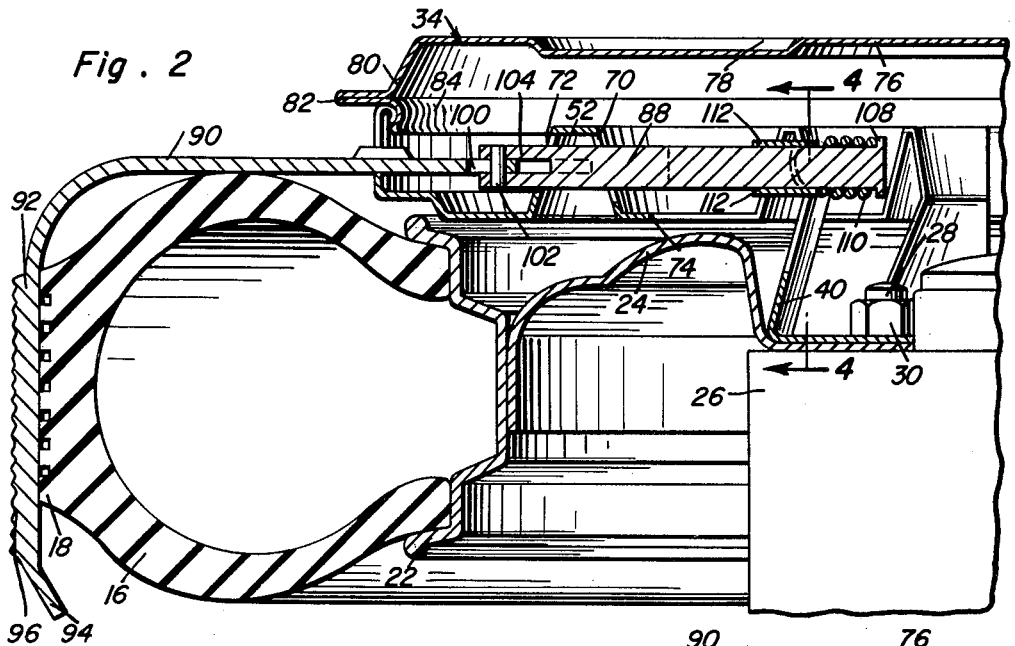

United States Patent Office 3,089,528
Patented May 14, 1963

3,089,528
CONVERTIBLE WHEEL TRACTION AID
Richard P. Aler, 130 Stevenson Lane, Baltimore, Md.
Filed June 14, 1962, Ser. No. 202,567
8 Claims. (Cl. 152—216)

The present invention generally relates to a traction aid for vehicle wheels such as those normally employed on road vehicles such as automobiles, trucks, buses and the like. More particularly, this invention relates to such a traction aid which may be considered convertible in that the traction aid may be converted from an operative position to a folded inoperative position whereby the traction aid may quite feasibly be permanently installed on the traction or driving wheel assemblies of vehicles without altering the normal operation of the vehicle wheels during periods of none-use of the traction aid by providing an easily convertible assembly which will provide secure and positive traction of the vehicle wheel when traveling over snow, ice or the like.

The primary object of the present invention is to provide a traction aid having a plurality of radially extending arms operatively associated with a mounting plate that is attached to the vehicle wheel assembly by use of the conventional lug bolts and nuts which normally retain the wheel in position thereby enabling use of the traction aid without modification of the vehicle wheel in any way whatsoever thereby providing a traction aid which is easy to install, foolproof in operation, long lasting due to its simplicity of construction, easy to convert from an operative to an inoperative position, provided with a cover for concealing and protecting all of the components of the radially extending arms when in folded inoperative position but only the inner ends of the arms when the arms are in operative position and yet relatively inexpensive to manufacture and maintain.

Another object of the present invention is to provide a wheel attached traction aid having radially extending foldable arms which may not only fold but rotate about a radial axis of the wheel for facilitating the interlocking engagement between each radial arm and a portion of the mounting plate therefor which releasably retains the arms in their operative position. The arms are curved in the direction of normal rotation of the vehicle wheel, that is, in the direction the vehicle wheel will rotate during forward movement of the vehicle.

Another very essential feature of the present invention is the provision of a traction aid having radially extending arms which are capable of radial movement in order to enable the outer end portion of the arm which extends transversely of the tread of the tire to move inwardly when it engages the ground surface since the tire will normally flex inwardly slightly at the point where it engages the ground surface thereby enabling the radial arms to absorb any shock that may be transmitted thereto due to engagement with a roadway surface or the like and further enabling the tread engaging portion of the arm to be partially pushed into the tread thereby providing a smooth ride with no substantial bumping or vibrations such as normally caused by the cross chains on conventional tire chains when traversing a clean paved street or the like.

Yet another important feature of the invention is the provision of a hand manipulated spring biased locking mechanism which retains the arms in their extended position and also retains the arms in their folded condition under spring tension to prevent loose free movement of the components.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a longitudinal, sectional view taken substantially upon a plane passing along section line 2—2 of FIGURE 1 illustrating the orientation of the components of the invention and their relationship to the vehicle tire and wheel;

FIGURE 3 is a sectional view similar to FIGURE 2 but illustrating the traction arm in folded or inoperative position;

Figure 1:
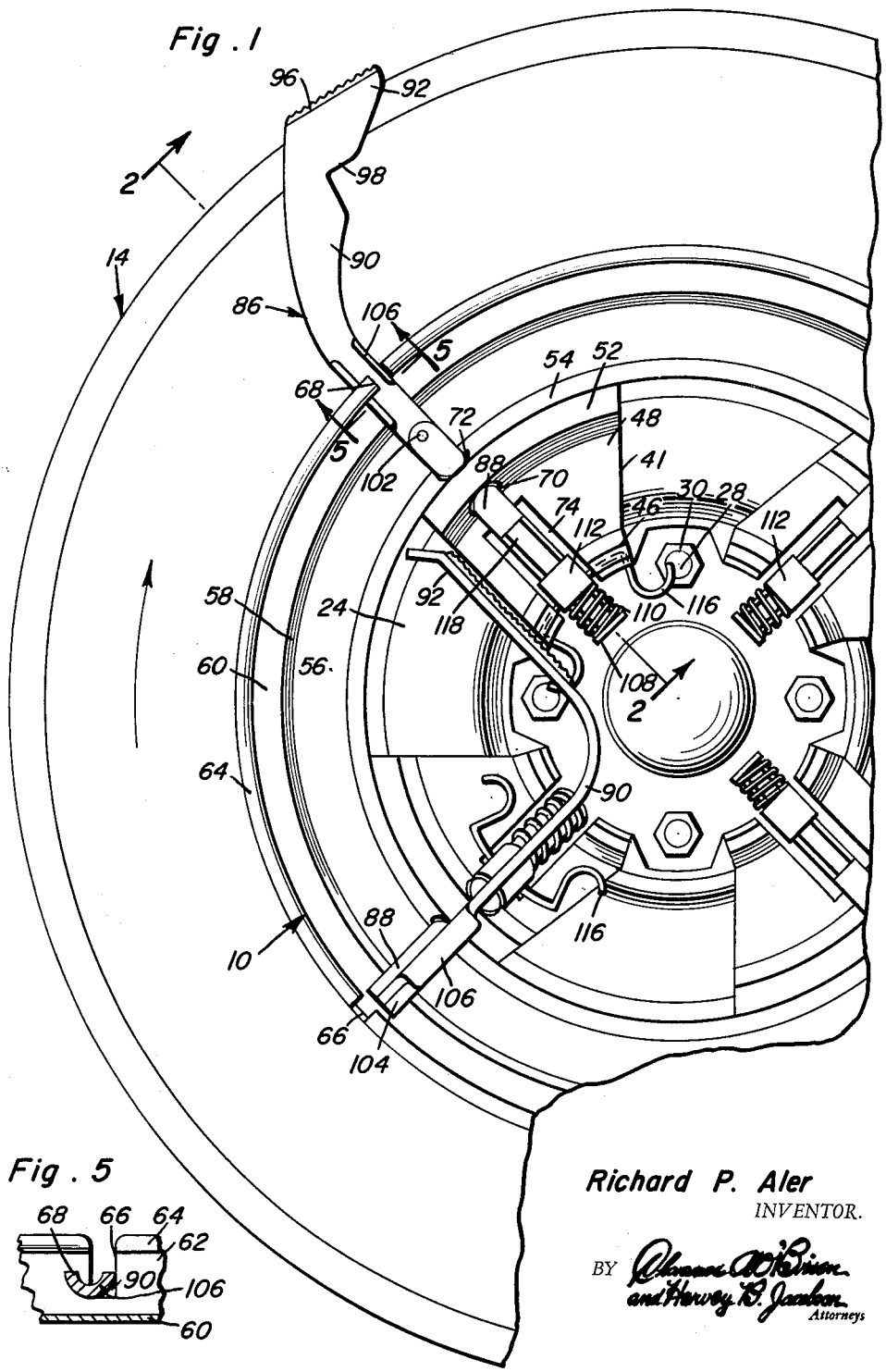
FIGURE 1 is a partial side elevational view of a vehicle traction wheel having the traction aid of the present invention installed thereon with one of the arms in the converted stored position and one of the arms shown in operative position.
Figure 5:
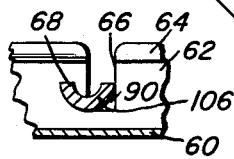

FIGURE 4 is a transverse, sectional view taken substantially upon a plane passing along section line 4—4 of FIGURE 2 illustrating further structural details of the inner end portion of the arm; and FIGURE 5 is a detailed sectional view taken substantially upon a plane passing along section line 5—5 of FIGURE 1 illustrating the structural details of the locking engagement between the arm and the periphery of the mounting plate.

Referring now specifically to the drawings, the numeral 10 generally designates the convertible traction aid of the present invention illustrated attached to a conventional vehicle wheel 14 which includes the usual pneumatically inflated tire 16 having a tread surface 18 and beads 20 which are received within peripheral flanges 22 on the wheel rim 24. The wheel rim 24 is mounted on the brake drum 26 of the vehicle by the usually provided lugs 28 and lug nuts 30 all of which represents conventional vehicle wheel structure. As illustrated, the lug pattern includes four lugs 28 such as is employed on certain vehicles. However, the present invention may be used with any lug pattern by merely providing a corresponding number of apertures therein for receiving the corresponding lug pattern. The fact that the present invention is illustrated with a wheel having a four lug pattern does not limit the application of the invention to such a wheel. Also, the particular configuration of the wheel rim 24 may vary and the device may be used with a tubeless tire as well as a tube tire or any other type of resilient tire.

The wheel traction aid 10 includes a mounting or supporting plate generally designated by numeral 32 which is circular in general configuration and has a diameter generally approximating the diameter of the rim 24 although this may vary thus enabling a single size of mounting plate to be used with different diameter rims. A generally circular cover plate generally designated by numeral 34 is provided for detachable engagement with the mounting plate and the cover plate 34 may have any suitable external configuration including ornamentation or the like which will enable the cover plate 34 to serve as a wheel disk or hub cap whereby the wheel traction aid of the present invention will be attractive and neat in appearance when installed with the cover plate being employed when the wheel traction aid is in operative position and also when in inoperative position for completely concealing the mechanism of the traction device when in inoperative position and concealing and protecting the major portion of the mechanism when it is in both positions.

The mounting plate 32 includes a central circular portion 36 having an aperture 38 therein receiving the hub or spindle of the brake drum with the aperture 38 being adapted to the particular construction of the vehicle wheel as to the size and shape thereof. Also, the central portion 36 is of a diameter to fit within the area normally receiving the lugs 28 and the circular central portion 36 is provided with openings positionable over the lug bolts 28 so that the lug nuts 30 will securely mount the mounting plate 32 in position.

At the outer edge of the circular plate 36, there is provided a plurality of upwardly extending arcuate segments 40 separated by enlarged open areas 41. The upwardly extending arcuate segments 40 are inclined slightly inwardly for a major portion of their length and then at the upper end thereof, the segments are inclined slightly outwardly and provided with an indentation or arcuate recess 42. The upper end of each arcuate segment is provided with an outwardly extending portion 44 which is quite narrow and a downwardly and outwardly inclined portion 46 terminating in a radially outwardly extending annular segment 48. At the outer edge of the annular segment 48 which extends between the open areas 41, there is provided an upwardly extending and outwardly inclined wall portion 50, a radially extending top edge portion 52 and a downwardly extending and outwardly inclined wall portion 54 thus defining an inverted U-shaped projection on the mounting plate which extends across the annular segments 48. Disposed outwardly of the wall 54 is a complete annular peripheral wall portion 56 and the wall 54 is also complete insofar as the annular extent thereof is concerned. The outer edge of the wall 56 is provided with an upwardly inclined portion 58 terminating in an outwardly offset annular wall portion 60. The annular wall portion 60 terminates in an outwardly extending wall 62 which is continuous and substantially cylindrical in configuration with the upper edge thereof terminating in an inwardly rolled bead 64.

The outer wall 62 is provided with a series of notches 66 therein in circumferentially spaced relation and each notch 66 is provided with an undercut edge portion 68 which is arcuate in configuration and which is located at the bottom of the notch 66 for a purpose described hereinafter. The inclined walls 50 and 54 each have enlarged openings 70 and 72 therein which openings are in alignment with the notch 68. Also, there is a continuous slot or notch 74 which extends from a point generally midway of the height of the arcuate segment 40 up through the recess 42, top wall portion 44, downwardly and outwardly inclined wall 46 and outwardly a major portion of the arcuate segment 48 as will be apparent from FIGURES 1 and 2.

The cover plate 34 has a central plate-like member 76 of circular configuration with indentations 78 therein for forming any desired surface ornamentation or the like. The outer edge of the circular plate 76 is provided with an inclined wall portion 80 which terminates in an outwardly extending reversely bent flange 82 which terminates in an outwardly opening arcuate bead 84 which is resiliently and frictionally engaged with the bead 64 and which is conformable in shape thereto. Both the bead 64 and the bead 84 are partially cylindrical in cross-sectional configuration whereby the cover plate will be snapped onto and locked to the bead 64 by forcing the bead 84 inwardly into the periphery of the bead 64 which is capable of being sprung outwardly slightly in view of the notches 66 which extend therethrough. The outwardly extending flange 82 completely overlies the bead 84 and conceals the interior of the mounting plate and forms a closure for the interior thereof except through the slot 66. Thus, with the cover plates 34 in position, the traction aid of the present invention may be permanently installed without detracting from the attractive appearance of the wheels of the vehicle.

Mounted on the mounting plate 32 is a plurality of radially extending traction arms generally designated by reference numeral 86. There is an equivalent number of traction arms to the number of arcuate segment plates 48 and the arms extend radially thereof. Each arm includes an inner rod-like member 88 and an outer arcuately curved plate-like member 90 which extends alongside the pneumatic tire 16 but which curves in the direction of rotation thereof as illustrated in FIGURE 1 with the arrow in FIGURE 1 designating the direction of rotation of the vehicle wheel. The plate 90 terminates in a traction member 92 in perpendicular relation thereto which extends across the tread face 18 of the tire 16. The free end of the traction member 92 is inwardly inclined as at 94 to generally retain the traction member 92 in position. The outer surface of the traction member 92 may be roughened as at 96 for increasing the traction qualities thereof. In the position illustrated in FIGURE 2 and also in the upper portion of FIGURE 1, the traction member 92 is in operative position engaging the tread face 18 with the plate 90 lying alongside of and generally radially of the pneumatic tire but being curved in the direction of rotation as illustrated in FIGURE 1. Also, the member 90 is provided with a notch 98 therein for facilitating the folded movement thereof described in detail hereinafter. The inner end of the member 90 is provided with an angulated slot 100 receiving a pivot pin 102 which extends between the furcations 104 on the bifurcated end of the inner rod-like member 88. Also, the member 90 has a portion thereof immediately outwardly of the slotted area provided with a substantially semi-cylindrical configuration 106 which is formed by the edges thereof being cut inwardly and turned upwardly. The semi-cylindrical configuration is of a dimension which will enable lateral movement into the notch 66 after which the member 90 may be rotated into a position alongside the tire so that the semi-cylindrical portion 106 will be rotated into the arcuate notch 68 or undercut portion which is at the bottom of the notch 68 thereby locking the outer portion 90 of the traction arm 86 to the outwardly extending flange or wall portion 62 of the mounting plate when in the operative position. Rotational movement of the traction arm 86 about a radial axis is permitted by virtue of the inner end portion 88 being journaled in the apertures 70 and 72 and by the fact that the inner end of the traction arm may be released from the recesses 42 in a manner described hereinafter.

The inner portion 88 of the traction arm 86 is provided with a peripheral flange 108 at the terminal inner end thereof which forms a seat for a coil spring 110 encircling the rod-like member 88. Engaging the other end of the spring 110 is a sleeve 112 having a pair of outwardly extending arms 114 integral therewith with each arm terminating in an inwardly offset but outwardy opening pair of finger hooks 116 which are generally semi-circular in configuration so that two fingers may be engaged with the finger hooks 116 for pulling the sleeve towards the flange 108 for compressing the spring 110. Normally, the outwardly extending arms 114 are disposed in the recesses 42 in the upwardly extending arcuate segments 40 thus preventing rotation of the sleeve 112. As illustrated in FIGURE 4, the sleeve 112 is of polygonal configuration and a portion of the rod-like member 88 is also of polygonal configuration as designated by the numeral 118 thereby preventing rotation of the traction arm 86 while the arms 114 are engaged in the notches or recesses 42 and while the sleeve 112 is engaged with the polygonal portion 118 of the rod-like member 82. The polygonal portion 118 of the rod-like member 88 as well as the sleeve 112 is illustrated as being octagonal but it is pointed out that other polygonal shapes may be used as long as the sleeve and rod-like member 88 are interengaged to prevent rotation thereof thereby securely retaining the entire traction arm in operative position due to the engagement of the semi-cylindrical portion 106 with the arcuate undercut notch 68 and the engagement of the sleeve 112 with the polygonal portion 118 of the rod-like member 88. This will retain the traction member 92 in position but still enable radial inward and outward movement of the traction arm 86 in relation to the wheel rim since the arm can slide in relation to the notch 66 and in relation to the apertures 70 and 72 and the spring 110 will retain the arms 114 engaged with the recesses during inward and outward movement of the traction arm 86 thus enabling the traction member 92 to move inwardly to eliminate to a substantial degree any bumping or vibrations that would be caused by the traction member engaging a roadway. Thus, the traction member 92 may flex inwardly along with the pneumatic tire for conforming generally with the pneumatic tire thereby enabling the pneumatic tire to engage the roadway and support the weight of the vehicle while the traction members 90 serve only to increase the traction thereof. Also, it is noted that the member 92 is arcuately curved to confirm with the contour of the tread surface thus further eliminating vibration that could be caused by the device.

In the lower portion of FIGURE 1, one of the traction arms 86 is illustrated in collapsed or inoperative position where it has been converted to a non-use position. When this occurs, it is only necessary to grasp the finger hooks 116, move them inwardly by compressing the spring 110 and then rotate the traction arm 86 about the radial axis defined by the member 88. This may be accomplished with the finger hooks held rearwardly or the inner end of the traction arm may be moved outwardly enough to disengage the arms 114 from the recesses 42 thus enabling the traction arm to be rotated for disengaging the semi-cylindrical portion 106 from the undercoat arcuate notch 68 thereby enabling the outer portion 90 to be folded inwardly about the pivot pin 102 to the position illustrated in FIGURE 3 in which the notch 98 is received over the end flange 108 and the member 90 is also received in the slot 74. In this condition, the inner rod-like member 88 is pivoted to an inclined position with the sleeve engaging a circular portion of the rod-like member 88 for enabling the finger hooks 116 to be disposed generally in the space outwardly of the arcuate plate 48. In this position, the member 92 is disposed in the open area as illustrated in the lower portion of FIGURE 1. The configuration of the openings 70 and 72 is such that the components may be shifted sufficiently to enable them to be disposed in their desired position with the member 92 disposed in the open area and the spring 110 still will maintain some degree of resilience and bias on the components thus preventing the components from vibration or rattling during normal use thereof.

The cover plate 34 must be removed in order to fold the traction arms to their inoperative position and, of course, will be replaced after the arms have been so folded as illustrated in FIGURE 3. Also, the angulated slot 100 will enable the outer end portions 90 of the traction arms 86 to be removed for replacement thereof in the event of wear or damage and also by removing the outer end portions of the arm 90, the inner end portions may also be removed by moving the same radially inwardly thus completely removing the traction arms 86 when desired. This will enable the mounting plate to be permanently installed and the traction arms may be installed only during the winter months when the traction aid could be expected to be used. Then when snow or ice conditions are encountered, it is a very simple matter for the vehicle owner or driver to remove the cover plate 34, unfold the traction arms and lock them in their operative position thus providing a traction aid which is readily convertible from the inoperative to the operative position. Then, after the vehicle has traversed the areas having poor traction qualities or after the hazardous conditions have been corrected, the traction aid may be readily converted to the inoperative position so that the vehicle wheel will operate in the normal and usual manner.

The present device requires no modification whatsoever of the vehicle wheel and no modification of the vehicle tire and will not cause any damage to the vehicle tire or wheel. Further, the device is quite simple to install and remove and quite easily converted from its operative to its inoperative position. Further, the simplicity of construction enables it to be used for long periods of time without any trouble and also enables a relatively inexpensive manufacturing cost as well as an inexpensive maintenance cost.

As previously indicated, the traction arms 86 may be individually retracted and extended. Therefore, one or more traction arms carried by each wheel may be moved to the extended positions as desired. Further, it is to be understood that the traction aid 10 may be constructed so as to include any feasible number of traction arms 86.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A convertible vehicle wheel traction aid comprising a mounting plate adapted to be secured to the vehicle wheel by use of the lug bolts and nuts, a plurality of radially extending traction arms mounted on the mounting plate and including an outer end adapted to extend transversely of the tread face of a tire carried by a vehicle wheel, said traction arm including an outer end portion and an inner end portion articulately interconnected whereby the outer end portion may be folded inwardly into overlying relation to the inner end portion, and means lockingly interconnecting the mounting plate and the outer end portion of the traction arm adapted to releasably retain the outer end portion of the traction arm in locked position alongside of a vehicle tire whereby the traction arm may be easily converted from an operative position to an inoperative position, said mounting plate including arcuate segments and arcuate open spaces adapted to receive the tread face engaging portion of the outer end portion of the traction arm when folded to inoperative position.

2. A convertible vehicle wheel traction aid comprising a mounting plate adapted to be secured to the vehicle wheel by use of the lug bolts and nuts, a plurality of radially extending traction arms mounted on the mounting plate and including an outer end adapted to extend transversely of the tread face of a tire carried by a vehicle wheel, said traction arm including an outer end portion and an inner end portion articulately interconnected whereby the outer end portion may be folded inwardly into overlying relation to the inner end portion, and means lockingly interconnecting the mounting plate and the outer end portion of the traction arm adapted to releasably retain the outer end portion of the traction arm in locked position alongside of a vehicle tire whereby the traction arm may be easily converted from an operative position to an inoperative position, said mounting plate being provided with a peripheral bead, a cover plate having a peripheral channel for frictionally and detachably engaging the bead for covering the mounting plate and the traction arm when in folded position thereby enabling the traction aid to be adapted to be permanently mounted on a vehicle wheel.

3. A convertible vehicle wheel traction aid comprising a mounting plate adapted to be secured to the vehicle wheel by use of the lug bolts and nuts, a plurality of radially extending traction arms mounted on the mounting plate and including an outer end adapted to extend transversely of the tread face of a tire carried by a vehicle wheel, said traction arm including an outer end portion and an inner end portion articulately interconnected whereby the outer end portion may be folded inwardly into overlying relation to the inner end portion, and means lockingly interconnecting the mounting plate and the outer end portion of the traction arm adapted to releasably retain the outer end portion of the traction arm in locked position alongside of a vehicle tire whereby the traction arm may be easily converted from an operative position to an inoperative position, said means lockingly interconnecting the outer end portion of the traction arm and the mounting plate including a peripheral flange on the mounting plate having a notch therein, said notch having an arcuate undercut inner end portion, said outer end portion of the traction arm having a substantially semi-cylindrical area having a cross-sectional dimension enabling it to be moved inwardly into the notch and then rotated for locking engagement with the arcuate undercut inner end of the notch.

4. A convertible vehicle wheel traction aid comprising a mounting plate adapted to be secured to the vehicle wheel by use of the lug bolts and nuts, a plurality of radially extending traction arms mounted on the mounting plate and including an outer end adapted to extend transversely of the tread face of a tire carried by a vehicle wheel, said traction arm including an outer end portion and an inner end portion articulately interconnected whereby the outer end portion may be folded inwardly into overlying relation to the inner end portion, and means lockingly interconnecting the mounting plate and the outer end portion of the traction arm adapted to releasably retain the outer end portion of the traction arm in locked position alongside of a vehicle tire whereby the traction arm may be easily converted from an operative position to an inoperative position, said mounting plate including an inverted U-shaped projection extending outwardly therefrom having aligned apertures therein loosely receiving the inner end portion of the traction arm thus enabling the traction arm to be rotated about its longitudinal axis and also moved laterally within the limits of the aligned openings.

5. A convertible vehicle wheel traction aid as defined in claim 4 wherein said mounting plate also includes an upstanding portion inwardly of the aligned openings, said upstanding portion having a vertical slot extending to the outer edge thereof for receiving the inner end portion of the traction arm, a sleeve slidably mounted on the inner end portion of the traction arm and including outwardly extending arms, said upstanding portion of the mounting plate having notch like recesses in the inner surface thereof for receiving the arms, means locking the sleeve non-rotatively on the inner end portion of the arm while permitting reciprocation thereof whereby the arms will prevent rotation of the traction arm when engaged in the recesses.

6. A convertible vehicle wheel traction aid as defined in claim 5 wherein said inner end portion of the traction arm includes a coil compression spring engaging the sleeve and urging the sleeve towards the upstanding portion of the mounting plate thus retaining the arms engaged with the recesses thus preventing rotation of the traction arm and maintaining the traction arm in operative position, said spring enabling the arms to be pulled inwardly for disengagement from the notches thus enabling the traction arm to be released from the mounting plate for folding to an inoperative position.

7. A convertible vehicle wheel traction aid as defined in claim 6 wherein each of said arms on the sleeve includes a finger hook on the terminal end thereof for enabling finger pressure to be exerted thereon for releasing the traction arm thereby enabling the traction arm to be converted without the use of any special tools.

8. A convertible vehicle wheel traction aid as defined in claim 7 wherein the means interconnecting the sleeve and the inner end portion of the traction arm includes a polygonal sleeve and a polygonal portion on the traction arm for locking the traction arm against rotation in one position of the sleeve and permitting rotation of the traction arm when the sleeve is disengaged from the polygonal portion of the traction arm.

References Cited in the file of this patent
UNITED STATES PATENTS

| | | |
|---|---|---|
| 1,049,751 | Maurer | Jan. 7, 1913 |
| 2,212,076 | Rollings | Aug. 20, 1940 |